April 1, 1952     R. B. BELLMER     2,591,333
VERNIER SCALE MEASURING DEVICE
Filed May 22, 1951
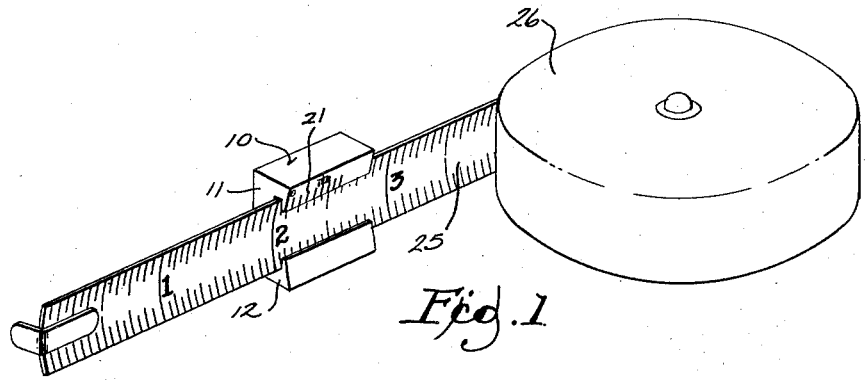
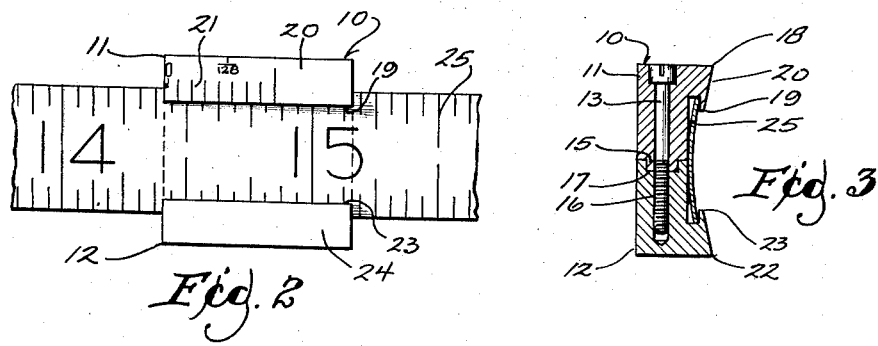
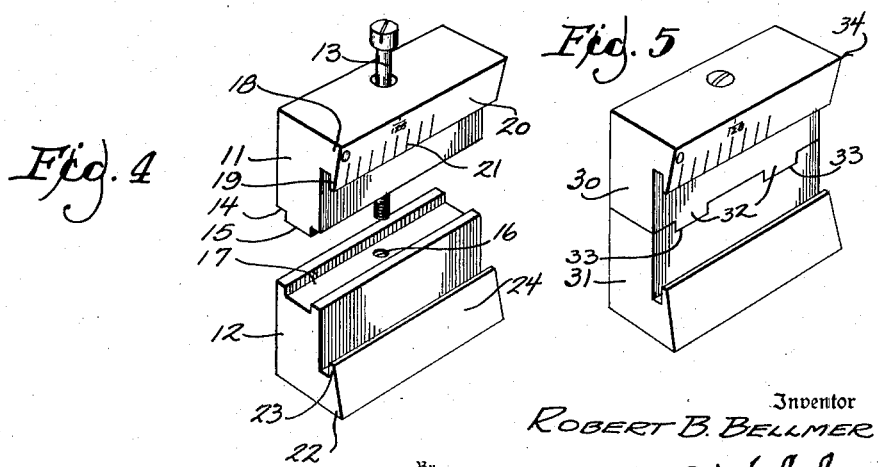
Inventor
ROBERT B. BELLMER
By Gerald P. Welch
Attorney Patented Apr. 1, 1952

2,591,333

UNITED STATES PATENT OFFICE 2,591,333

VERNIER SCALE MEASURING DEVICE

Robert B. Bellmer, West Allis, Wis.

Application May 22, 1951, Serial No. 227,702

5 Claims. (Cl. 33—137)

This invention relates to improvements in vernier scale measuring devices, and more particularly to a novel vernier scale measuring device adapted for use with a flexible measuring rule.

An object of the invention is to provide a device of the type formed of a composite block which may be engaged slidingly on a flexible scale.

Another object of the invention is to provide a device of the type so graduated that a certain convenient number of its divisions are just equal to a certain number, either one less or one more, of the divisions of the scale, so that parts of a division are determined by observing the lines on the vernier coinciding with a line on the flexible rule.

Other and further objects of the invention will be apparent as the description proceeds, reference being had to the accompanying drawing, in which:

Fig. 1 is a view in perspective of a vernier measuring device embodying the invention attached to a flexible steel rule.

Fig. 2 is a plan view of the device together with a fragmentary portion of the steel rule.

Fig. 3 is a sectional view taken transversely of the device.

Fig. 4 is an exploded view in perspective of the device.

Fig. 5 is a view of another form of the device.

Referring more particularly to the drawing, the numeral 10 refers to the device generally, comprising a composite block formed of the segments 11 and 12, provided with the centrally and transversely disposed threaded means 13. The segment 11 is centrally and transversely bored to accommodate the means 13 and is provided on its inner edge 14 with the longitudinally extending tongue 15. The segment 12 is centrally and transversely drilled and tapped at 16 to releasably secure the threaded means 13. The segment 12 has a longitudinally disposed groove at 17 of its inner edge complementary to the tongue 15 of the segment 11. Segment 11 has a raised portion 18 at the outer edge thereof provided with an inwardly projecting ledge 19, the top surface 20 of which is inclined inwardly downwardly and graved with the graduations as at 21, and in the form shown, the eight divisions constitute seven-eighths of an inch. The segment 12 has a similar raised portion 22 provided with a like inwardly projecting ledge 23 and the top downwardly inclined face 24.

In use, the steel rule 25 may be partially extended from the drum 26 as shown in Fig. 1 of the drawing, and the block 10 may be engaged with said rule. The element 13 may then be adjusted as desired to maintain the relative tension of the segments 11 and 12 on the rule 25. The vernier scale 21 may then be used in relation to the conventional scale on the rule 25.

It will be understood that other graduations may be employed on either or both of the top inclined surfaces of the segments 11 and 12.

In Fig. 5 is shown another form of the invention characterized 30 and 31 being divided longitudinally, but having the plural tongues 32 and the grooves 33 disposed transversely at right angles to the longitudinal division of the composite block 34.

It will be understood that the device is capable of many modifications in structure and design, without departing from the spirit of the invention, within the scope of the appended claims.

Having thus described the invention, what is claimed and desired to be secured by Letters Patent of the United States, is:

1. A device of the character described comprising a divided block, opposed inwardly directed ledges thereon adapted to retain a flexible rule thereunder, adjustable means connecting the divided portions of said block, and a vernier scale graved on the upper surface of one of said ledges.

2. A device of the character described comprising a centrally longitudinally divided block, opposed inwardly directed ledge means thereon adapted to retain a flexible rule thereunder, threaded means connecting the divisions of said block, inwardly slanted upper surfaces topping said ledge means, and a vernier scale graved in at least one of said upper surfaces.

3. A device of the character described comprising a divided block, opposed inwardly directed ledge means thereon adapted to retain a flexible rule, centrally transversely disposed threaded means connecting the divisions of said block, inwardly slanted upper surfaces topping said ledges, and a vernier scale graved in at least one of said upper surfaces.

4. A device of the character described comprising a centrally longitudinally divided block of rectangular form, complementary tongue and groove formations disposed between said divisions, opposed inwardly directed ledge means on said divided portions adapted to retain a flexible rule, centrally transversely disposed threaded means connecting said divided portions for relative adjustment thereof, inwardly slanted upper surfaces topping said ledges, and a vernier scale graved on at least one of said slanted surfaces.

5. A device of the character described comprising a divided block, opposed inwardly directed ledge means thereon for slidable retention of a rule, centrally transversely disposed threaded means for relative adjustment of the divisions of said block, and plural transverse tongue and groove means connecting said divisions, inclined top surfaces on said ledge means, and vernier indicia on at least one of the said surfaces.

ROBERT B. BELLMER.

No references cited.